April 21, 1953 W. S. PRAEG 2,635,507
METHOD FOR CROWN FINISHING GEARS
Filed Nov. 3, 1947 2 SHEETS—SHEET 1

INVENTOR.
WALTER S. PRAEG
BY
Whittemore Hulbert
& Belknap ATTORNEYS

April 21, 1953 W. S. PRAEG 2,635,507
METHOD FOR CROWN FINISHING GEARS
Filed Nov. 3, 1947 2 SHEETS—SHEET 2
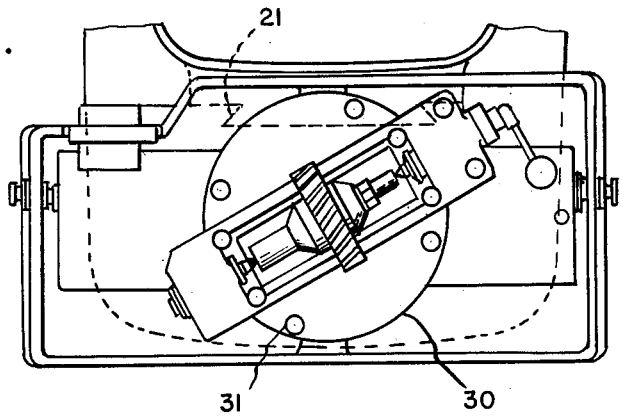
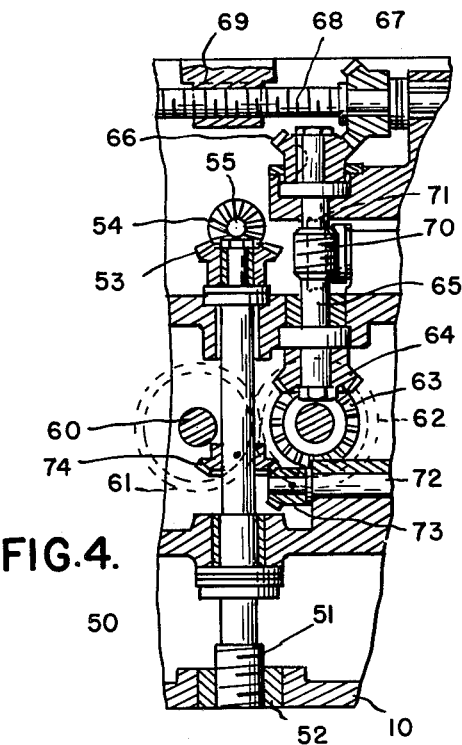
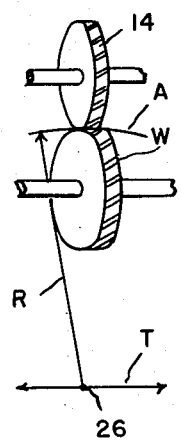
INVENTOR.
WALTER S. PRAEG
BY Whittemore, Hulbert & Belknap ATTORNEYS Patented Apr. 21, 1953

2,635,507

UNITED STATES PATENT OFFICE 2,635,507

METHOD FOR CROWN FINISHING GEARS

Walter S. Praeg, Detroit, Mich., assignor to National Broach & Machine Company, Detroit, Mich., a corporation of Michigan Application November 3, 1947, Serial No. 783,796

1 Claim. (Cl. 90—1.6)

The present invention teaches a method by which the recognized benefits of gear crowning may be practiced in connection with a newly developed method of gear finishing or shaving known as "diagonal traverse." The method of gear shaving referred to as "diagonal traverse" involves the finishing of gears by meshing them with a gear-like finishing tool which may be in the form of a shaving tool with the axes of the gear and tool crossed in space at an angle between 2° and 20°. The gear member and tool member are thereafter rotated at substantial speeds in mesh while relative traverse is carried out between the members in a direction which occupies a plane parallel to the axes of both of said members and which is inclined to the direction of the axis of the gear member by a substantial angle which is nevertheless less than 60°. This angle is referred to as the angle of diagonal traverse and preferably is selected to lie between 10° and 45°.

The relative traverse between the gear and tool is effective to distribute the finishing action of the tool longitudinally of the teeth of the gear and as thus far described will result in the production of gear teeth which are acccurately finished and which are uniform from end to end. In order to provide for increased flexibility in the use of gears and to avoid undesirable end contact between the teeth of meshing gears, it has been the practice recently to provide gear teeth which are crowned or which are of reduced thickness adjacent their ends as compared to the thickness at the center thereof. This results in concentrating the bearing between meshing teeth centrally thereof and permits certain minor misalignment either in an initial setup or as the result of distortion under load, without introducing end bearing between the teeth.

In accordance with the present invention a second relative motion between the teeth of a gear being finished and the gear-like finishing tool is introduced in timed relation with the relative traverse referred to. This additional relative motion is a rocking motion about an axis which is parallel to a plane parallel to the axes of both the gear and tool member and which is perpendicular to the direction of relative traverse between the gear and tool.

With the foregoing general remarks in mind, it is an object of the present invention to provide a new method of shaving gears which combines beneficial results of diagonal traverse as defined herein and crowning.

More specifically, it is an object of the present invention to crown finish gear teeth by a method which comprises rotating a gear and tool in mesh at limited crossed axes, relatively traversing said gear and tool in a direction which occupies a reference plane parallel to the axes of said gear and tool, and simultaneously in timed relation to said traverse, effecting a limited rocking motion between said gear and tool about an axis which is parallel to said reference plane and which is perpendicular to the direction of relative traverse.

Other objects and features of the invention will become apparent as the description proceeds, especially when taken in conjunction with the accompanying drawings, wherein:

Figure 3 is a fragmentary plan view of the work supporting mechanism;

Figure 4 is a fragmentary sectional view showing a portion of the operating mechanism; and Figure 5 is a diagrammatic view illustrating the relative motions which characterize the present method.

Figure 2:
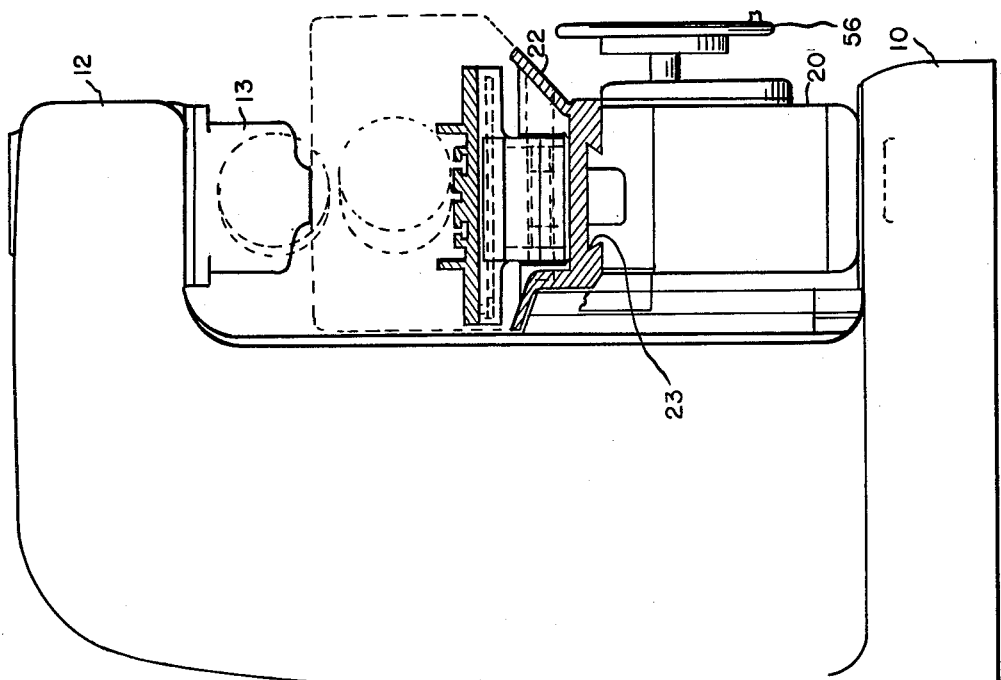
Figure 2 is a side elevation of the machine illustrated in Figure 1; partly in section.

The gear finishing machine illustrated in Figures 1 to 4 comprises a main frame having a forwardly extending base 10 and a vertically extending column or pedestal 11 which terminates in a forwardly projecting overhanging arm 12. A tool supporting head 13 is adjustably carried by the arm 12 and is mounted for adjustment about a vertical axis. Drive means (not shown) are mounted in the arm 12 for effecting rotation of a rotary finishing tool 14.

Vertically adjustable on the front of the column 11 is a knee 29, ways for guiding the knee for vertical movement being indicated in Figure 3 at 21. At the top of the knee is provided a traversing carriage 22, suitable horizontal ways being indicated at 23 in Figure 2. The ways 23 extend horizontally across the front of the machine and accordingly limit traverse of the carriage 22 to horizontal traverse in a like direction. A rocking table 25 is carried by the carriage 22, a trunnion support 26 being provided which extends horizontally from front to back of the machine.

The rocking table 25 carries an adjustable work supporting structure at its top and this structure comprises a circular base plate 30 adapted to be clamped in angularly adjusted position at the top of the rocking table 25, clamping bolts 31 being provided for this purpose which cooperate with circular T-slots formed in the upper surface of the rocking table 25. Secured to the upper surface of the base plate 30 are head and tailstocks 35 and 36 between which a work piece W is adapted to be mounted for free rotation.

With the structure thus far described it will be observed that the machine provides means for supporting a gear-like tool 14 and a work gear W with their axes both occupying horizontal planes. The tool support 13 and the work supporting structure including the base plate 30 are both angularly adjustable so that a gear and gear-like tool may be brought into mesh with their axes horizontal and extending angularly with respect to each other or crossed in space. It will of course be understood that the orientation of the axes with respect to horizontal or vertical is immaterial, the essential feature being that the structure provides means for supporting a gear and gear-like tool in mesh with their axes both parallel to a common reference plane and crossed with respect to each other. Since relative traverse effected by translation of the carriage 22 is also horizontal in the illustrated embodiment, it will be observed that the machine provides means for effecting relative traverse between the gear and tool in a direction which is parallel to the reference plane referred to.

Figure 1:
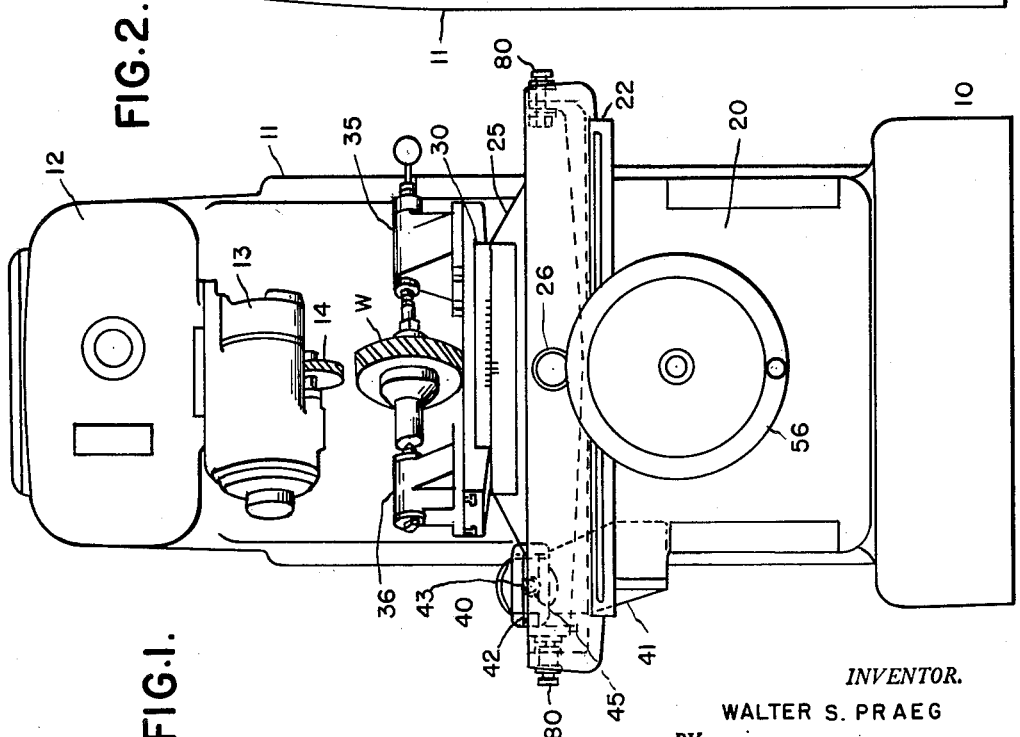
Figure 1 is a front elevation of a machine designed to carry out the present invention.

In order to carry out the gear finishing method known as diagonal traverse with the apparatus thus far described, the gear and tool are brought into mesh by a vertical adjustment of the knee 20 after which rotation is imparted to the tool 14 which thereby rotates the work gear W. Relative traverse is then effected by reciprocating the carriage 22 to the right and left as seen in Figure 1.

In order to effect the crowning operation referred to, the rocking table 25 is given a limited rocking movement about the trunnion axis 26 in timed relation to the relative traverse referred to. Means for effecting the rocking motion are herein illustrated as comprising an adjustable cam block 40 carried by a bracket 41 extending upwardly from the knee 20. The cam block 40 is provided with a cam slot 42, the inclination of which with respect to the horizontal may be varied by adjustment of the cam block 40 about a pivot axis 43. Mounted on the carriage 22 is a laterally projecting pin or cam follower 45 which is adapted to enter the cam slot 42. If the cam slot 42 is inclined with respect to the horizontal, right and left traverse of the carriage 22 will cause rocking movement of the table 25 about the trunnion axis 26 as a result of the camming action of the cam slot 42 and the cam follower 45. The amount of relative rocking motion thus provided may of course be varied as desired by adjustment of the cam block 40.

Referring now to Figure 4, mechanism for effecting vertical adjustment of the knee 20 and traverse of the carriage 22 is illustrated. This means comprises in the first place a vertical feed shaft 50 having a threaded feed screw portion 51 cooperating with a feed nut 52 carried by the forwardly extending base 10 of the machine. At the upper end of the feed shaft 50 is a bevel gear 53 meshing with a bevel gear 54 carried by a shaft 55 which extends to the front of the machine and carries an adjusting hand wheel 56.

Means for effecting traverse of the carriage 22 comprises a drive shaft 60 connected through gears 61 and 62 to a bevel gear 63 which in turn drives bevel gear 64 keyed or otherwise secured to the vertically extending shaft 65. At its upper end end the shaft 65 has keyed or otherwise secured thereto a bevel gear 66 meshing with a bevel gear 67 keyed or otherwise secured to a horizontal feed screw 68. The carriage 22 has depending therefrom a feed nut 69 which receives the threaded portion of the feed screw 68 and accordingly rotation of the feed screw 68 in one direction or the other results in corresponding horizontal traverse of the carriage 22. Means are also provided for effecting automatic vertical feed of the knee 20. This means comprises a worm 70 secured to the shaft 65 meshing with a worm gear 71 which is connected by suitable intermittent feed means (not shown) to a shaft 72 carrying a bevel gear 73 which meshes with a bevel gear 74 keyed or otherwise secured to the vertical feed shaft 50.

In order to practice the present invention with the machine illustrated, the work gear W is mounted between the stocks 35 and 36 so that its axis extends at a substantial angle with respect to the direction of relative traverse. This angle is less than 60° in all cases and preferably is between 10° and 45°. An appropriate gear finishing tool is selected which will mesh with the work gear W with the axes of the gear and tool crossed in space at a small angle between 2° and 20°. It will be noted at this time that with the tool 14 and the gear W in intermediate position, the axis about which the relative rocking motion takes place is intersected by an extension of the line drawn from the center of the tool 14 through the center of the gear W. The cam block 40 is adjusted to give the desired inclination to the cam slot 42 and block pins 80 which extend from the carriage 22 into appropriate recesses formed in the ends of the rocking table 25 are withdrawn to permit rocking movement of the table. When the machine is to be employed without crowning, the camming means is disconnected and the pins 80 are engaged in the recesses to rigidly interconnect the rocking table and the carriage 22.

With the tool 14 rotating at substantial speeds and thereby driving the work gear W relative traverse of the carriage 22 is effected through the medium of the horizontal feed screw 68 and the feed nut 69 previously described. This traverse of the carriage 22 is effective to cause distribution of the finishing action of the tool 14 from end to end of the gear teeth and at the same time to effect a rocking motion of the rocking table 25. This rocking motion may be considered as reaching a maximum at one end of the traverse stroke of the carriage, passing through a zero condition at the center of the stroke and reaching the second maximum in the opposite direction at the end of traverse. The cycle is reversely repeated upon the return stroke. The rocking motion has the effect of raising the ends of the gear teeth gradually as the end of stroke is approached so that more stock is removed from adjacent the ends of the gear teeth than centrally thereof.

The present method permits finishing of gear teeth at different traverse angles in the simplest possible manner inasmuch as the only adjustments necessary to set up different traverse angles on the machine are the angular adjustment of the base plate 30 to set a desired traverse angle on the machine and a corresponding adjustment of the tool support about a vertical axis to bring the teeth of the tool 14 into proper alignment with the teeth of the gear W.

It is desired to emphasize the fact that the relative rocking motion when combined with diagonal traverse takes place about an axis which is necessarily oblique with respect to the axis of the work gear, inasmuch as the axis of the work gear is inclined by an angle identified as the traverse angle with respect to the direction of traverse, and the axis about which relative rocking takes place is perpendicular to the direction of traverse.

Referring now to Figure 5, there is diagrammatically illustrated the relationship of the parts when the herein disclosed method of crowning with diagonal traverse is employed. In this figure the gear W is meshed with the tool 16 with their axes crossed in space as indicated. Relative traverse between the gear and tool is effected in a direction indicated by the arrow T, this arrow occupying the plane of the paper in this figure and being therefore inclined with respect to the axes of both the gear and tool. Relative traverse in the direction of the arrow T is accompanied by relative rocking motion in the arc A which is described by the radius R, being the distance from the trunnion support 26 to the top of the gear W. It is appreciated that the actual movement of the gear W is therefore a resultant movement compounded from simultaneous traverse and rocking.

Actual tests have demonstrated that the effect of the combination of relative traverse and rocking about the axis specified results in removing more material from adjacent the ends of the gear teeth than from the mid portion thereof without introducing excessive deviation from tooth form, particularly as regards the involute. Gear teeth finished in accordance with the present invention when checked and charted for lead show a smoothly curved longitudinal convexity, the mid portion of the gear teeth from end to end being tangent to the theoretical lead designed for the particular gear. Accordingly, one or a mating pair of gears finished in accordance with the present invention operate smoothly and have substantial central bearing which is not substantially shifted longitudinally of the teeth by slight misalignment of the teeth or by slight deflection under load.

The method of diagonal traverse finishing of gears as disclosed herein and in my prior copending application Serial No. 765,009, now Patent No. 2,554,752, granted May 29, 1951, affords the possibility of finishing gear teeth in a much more rapid manner than has hitherto been possible. While the reasons for the more rapid removal of metal are not fully understood, the advantages of the method have been clearly demonstrated in commercial production. The present method of crowning permits the retention of all of the advantages of the improved diagonal traverse method while at the same time incorporating the known advantages of gear crowning.

As stated above, the direction of relative traverse between the gear and tool occupies a plane parallel to the axes of both gear and tool and makes an angle in said plane of less than 60° and preferably between 10° and 45° with the angle of the gear. In addition, it is preferable that the direction of relative traverse shall be against the helix angle of the teeth of the gear. As fully explained in my Patent No. 2,554,752, this language means that the direction of relative traverse of the gear and tool shall occupy the quadrants containing the perpendiculars to the direction of the engaged teeth of the gear.

The drawings and the foregoing specification constitute a description of the improved method and machine for crown finishing gears in such full, clear, concise and exact terms as to enable any person skilled in the art to practice the invention, the scope of which is indicated by the appended claim.

What I claim as my invention is:

A method of crown shaving gears which comprises meshing a gear member and gear-like shaving tool member with their axes crossed at an angle between 2 degrees and 20 degrees, rotating one of said members directly and the other of said members through their meshed engagement, and providing a compound crowning motion of which one component is a relative back and forth traverse between said members in a reference plane which plane is parallel to the axes of both of said members when said members are in an intermediate neutral position with the common normal to their axes midway between the sides of said gear member, and in a direction in said reference plane which is inclined to the axes of both of said members and which makes a substantial angle of less than 60 degrees with the axis of said gear, the extent of said relative traverse being sufficient to cause the common normal to the axes of said members to migrate from one side of said gear member to the other side thereof, and the second component of which is a relative rocking motion between said members about an axis parallel to said plane and perpendicular to the direction of relative traverse, said axis being located at the opposite side of said gear member from said tool member, the relative rocking motion being provided by rocking one of said members continuously in the same direction during traverse in one direction from an initial position in which the common normal to the axes of said members is at one side of said gear member, through said intermediate neutral position, to a limiting position in which the common normal to the axes of said members is at the other side of said gear member, the rocking being in a direction to cause a gradual separation between the portions of the axes of said members intersected by the migrating common normal thereto until said common normal reaches the midplane of the gear member and a gradual approach between the portions of the axes intersected by the migrating common normal thereto as said common normal moves from the midplane of said gear member to the opposite side thereof.

WALTER S. PRAEG.

References Cited in the file of this patent

UNITED STATES PATENTS

| Number | Name | Date |
| --- | --- | --- |
| 2,157,981 | Drummond | May 9, 1939 |
| 2,536,343 | Austin | Jan. 2, 1951 |
| 2,542,569 | Praeg | Feb. 20, 1951 |
| 2,561,706 | Miller | July 24, 1951 |
| 2,612,080 | Davis | Sept. 30, 1952 |

FOREIGN PATENTS

| Number | Country | Date |
| --- | --- | --- |
| 480,247 | Great Britain | Feb. 14, 1938 |